Sept. 23, 1969　　　　　M. E. HUVERS　　　　　3,469,102
DRIFT ANGLE METER FOR MEASURING THE DRIFT ANGLE OF AIRCRAFT
Filed Sept. 18, 1967　　　　　　　　　　　　　　9 Sheets-Sheet 1
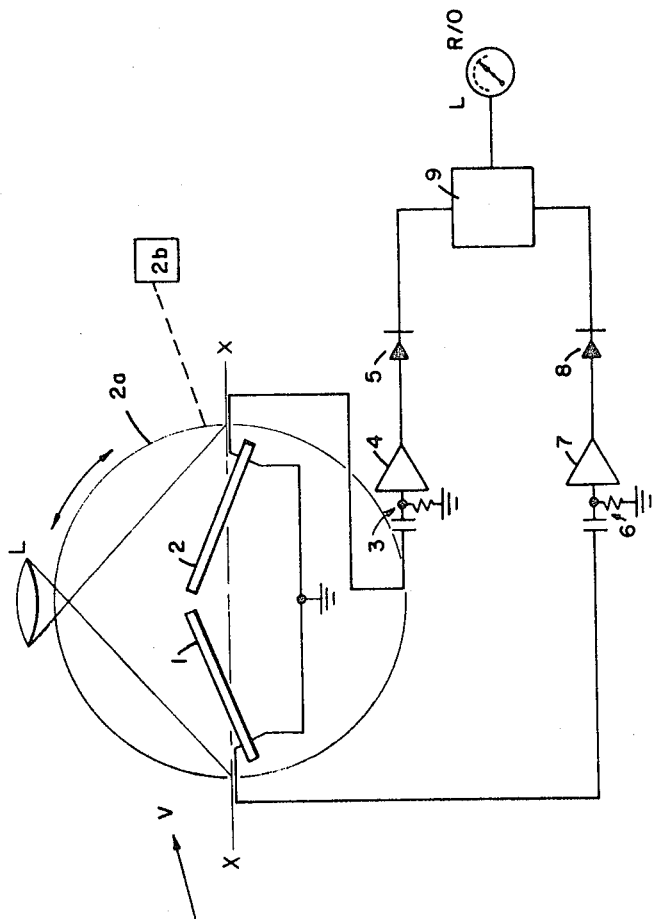
FIG. I
INVENTOR
MARIUS E. HUVERS Sept. 23, 1969   M. E. HUVERS   3,469,102
DRIFT ANGLE METER FOR MEASURING THE DRIFT ANGLE OF AIRCRAFT
Filed Sept. 18, 1967   9 Sheets-Sheet 2

INVENTOR
MARIUS E. HUVERS
By Cushman, Darby & Cushman
ATTORNEYS

Sept. 23, 1969    M. E. HUVERS    3,469,102
DRIFT ANGLE METER FOR MEASURING THE DRIFT ANGLE OF AIRCRAFT
Filed Sept. 18, 1967    9 Sheets-Sheet 3

INVENTOR.
MARIUS E. HUVERS
BY
Cushman, Darby & Cushman
ATTORNEYS

Sept. 23, 1969    M. E. HUVERS    3,469,102
DRIFT ANGLE METER FOR MEASURING THE DRIFT ANGLE OF AIRCRAFT
Filed Sept. 18, 1967    9 Sheets-Sheet INVENTOR
MARIUS E. HUVERS
By
Cushman, Darby & Cushman
ATTORNEYS

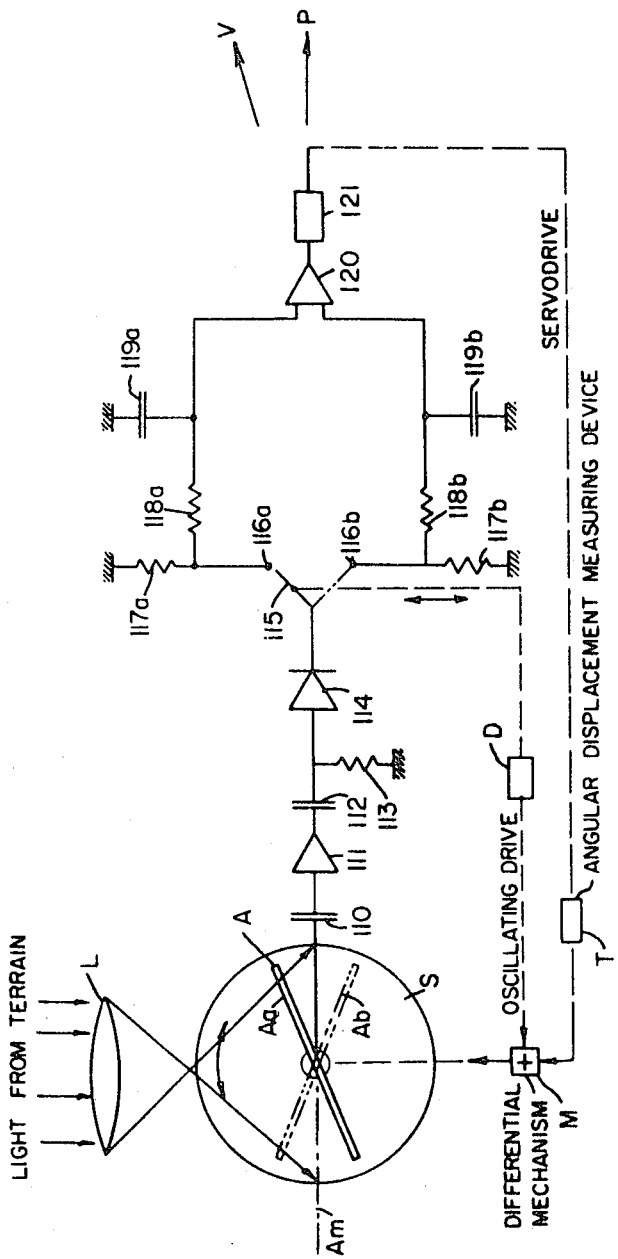

Sept. 23, 1969                    M. E. HUVERS                    3,469,102
          DRIFT ANGLE METER FOR MEASURING THE DRIFT ANGLE OF AIRCRAFT
Filed Sept. 18, 1967                                      9 Sheets-Sheet 7

INVENTOR
MARIUS E. HUVERS

BY
Cushman, Darby & Cushman
ATTORNEYS

United States Patent Office 3,469,102
Patented Sept. 23, 1969

3,469,102
DRIFT ANGLE METER FOR MEASURING THE DRIFT ANGLE OF AIRCRAFT
Marius E. Huvers, Therese, Quebec, Canada, assignor to Canadair Limited, Montreal, Quebec, Canada
Filed Sept. 18, 1967, Ser. No. 668,492
Claims priority, application Canada, Sept. 27, 1966, 971,421
Int. Cl. H01j 39/12
U.S. Cl. 250—209            19 Claims

ABSTRACT OF THE DISCLOSURE

The drift angle meter for use in aircraft, as described, includes elongated photosensitive means arranged to receive an optical image of the ground underlying the moving aircraft. Positioning means are provided for positioning the photosensitive means or alternatively the optical image such that one occupies relative to the other a pair of angular positions symmetrically located with respect to a medial position. The output of the photosensitive means is fed to a circuit means which is constructed to produce a signal indicative of a frequency difference in the output of the photosensitive means at the said pair of angular positions thereby giving an indication of an angular displacement between the medial position and the direction of the ground speed vector of the moving aircraft. The positioning means are arranged to permit adjustment of the medial position whereby the latter may be adjusted in a direction to nullify any difference in the frequency output of the photosensitive means. Suitable means are provided for measuring the angle of displacement between the adjusted medial position of the longitudinal axis of the aircraft to thereby give an indication of drift angle. The photosensitive means may comprise a pair of crossed photocells arranged in an X pattern or alternatively a single elongated photocell may be used with the positioning means being constructed to provide relative oscillation between the optical image and the photosensitive means. The output of the circuit means may be connected to a suitable servo-motor such as to drive the positioning means in a direction to reduce the frequency difference referred to above.

---

This invention relates to the automatic and continuous determination of the drift angle of a manned or unmanned air vehicle. By drift angle is meant the horizontal angle between the longitudinal axis of the vehicle and its horizontal velocity vector with respect to the earth.

The prior art has provided automatic drift angle meters which use a double image of the underlying ground. A photosensor is interrupted by means of a grating located in front of each cell. The two gratings are oriented at slightly different angles and are each mounted on a rotatable platform, both platforms being rotated by a common drive. When the vehicle moves with respect to the ground, light spots on earth will generate a fluctuating output of the photosensors, the gratings working as input interruptors. The photosensors whose grating has the largest angle with respect to the ground speed vector will generate the highest frequency signal. The difference in frequency of the two photosensor outputs is used to steer the two gratings to an angular position where the outputs have equal frequencies, this being the position that places the gratings symmetrically about the vehicle's horizontal velocity vector with respect to the ground. The angle between the line of symmetry of the two gratings and the vehicle axis is the observed drift angle and can be measured and used remotely. The difference in photosensor output frequency is determined by frequency discrimination of the output signals. The highest frequency will show the highest amplitude, and the rectified amplitudes are then compared.

The above method gives an incorrect indication of the drift angle, if a large ground feature with a higher or lower brightness than its background (a cornfield, road, canal, etc.) happens to have one side parallel or nearly parallel to the grating lines. The photosensor behind that parallel grating then receives a very strong light input change each time the terrain feature side enters a new clear grating line, and hence this photosensor gives an overly high signal to the comparator of the two outputs. This could result in an erroneous drift angle measurement as long as the terrain feature is projected on the grating. In addition, the system requires the use of two optical images, which results in a higher degree of complexity.

The prior art has also provided automatic drift meter systems utilizing only one optical image of the underlying ground and one photosensor positioned behind a grating similar to that described above. The grating and the photosensor, or alternatively only the grating, are continuously rotated by a motor. Hence relatively moving light spots of the image projected on the rotating grating are continuously interrupted while crossing the grating. If the light spot motion is perpendicular to the momentary position of the grating lines, the chopping frequency is the highest. Hence a frequency modulated signal is generated which shows its lowest frequency when the grating lines are parallel to the light spot motion. Using a reference oscillating signal and a phase comparator circuit and changing the phase of the optical oscillating signal by means of a servo-motor, the optical oscillating signal can be brought in phase with the reference oscillating signal. The required phase angle change to obtain equal phase is equivalent to the occurring drift angle.

In the operation of systems having the character described above the circumferential speed of the grating should be low with respect to the image motion resulting from the forward speed of the vehicle; otherwise the signal due to the forward speed is buried or drowned in the signal caused by the grating rotation. For high altitude and low speed, the grating rotational speed has to be very slow, e.g., one rotation in 10 seconds. However, it has been found extremely difficult to control the servo-motor directly by means of these two low frequency A.C. voltages and the accuracy of the system is not great enough to meet present day requirements.

Still another drift meter system uses a narrow slot in front of a photocell. It is known that the highest random frequency spectrum is obtained in a system of this nature when the slot is perpendicular to the image motion, and so the slot is manually oriented to obtain this highest frequency. The resulting position of the slot with respect to the vehicle axis gives the drift angle. It can be shown that the shift of frequency is a function of the cosine of the angle between the slot or oblong cell and the normal to the direction of image motion. Since this system requires that one seek the position where this angle is zero, it can be seen by looking at the graph of a cosine function that this is the point where the slope of the function is zero, and it is therefore evident that this system is inherently inaccurate.

Other known systems do not use gratings or photocells but measure drift angle by tracing the ground image path and comparing the angle this path makes with the vehicle axis. These methods, in addition to being very slow and discontinuous, require manual operations and/or adjustments.

It is an object of the present invention to provide an automatic drift angle meter which overcomes to a substantial degree the shortcomings of the prior art referred to above.

An object of the present invention is to provide an improved and simplified drift angle meter which maintains high accuracy under varying conditions of light level and temperature, and whose accuracy is not affected to any substantial degree by elongated terrain features which contrast sharply with their associated backgrounds.

In accordance with the invention in one aspect there is provided a drift angle meter for use in aircraft, elongated photosensitive means positioned to receive an optical image of the ground underlying the moving aircraft and including means for positioning the photosensitive means or alternatively, the optical image such that one occupies relative to the other a pair of angular positions symmetrically located with respect to a medial position. Circuit means are associated with said photosensitive means with the circuit means being constructed and arranged to produce a signal indicative of a frequency difference in the output of the photosensitive means at said pair of angular positions thereby giving an indication of an angular displacement between said medial position and the direction of the ground speed vector of the moving aircraft. The positioning means referred to above are arranged to permit adjustment of the medial position whereby the latter may be adjusted in a direction to nullify any such frequency difference in the output of the photosensitive means. Means are also provided for measuring the angle of displacement between such adjusted medial position and the longitudinal axis of the aicraft to thereby give an indication of drift angle.

In one embodiment of the invention the elongated photosensitive means comprises a pair of elongated sensors symmetrically positioned with respect to an axis of symmetry and both mounted on a common support in the plane of the optical image of the relatively moving ground. In its simplest form the support is manually adjustable to thereby change the position of the axis of symmetry with respect to the ground speed image to a position wherein the signal referred to above is nulled. In a more sophisticated arrangement a servo-motor responsive to such signal drives the support in the proper direction until such signal is nulled. In all cases the angle of displacement between the medial axis (axis of symmetry) and the longitudinal aircraft axis is measured by suitable transducer means e.g., a potentiometer and translated in a convenient way for use in a desired manner by the pilot of the aircraft or an operator.

In a further form of the invention the photosensitive means includes a single light responsive elongated sensor which is mounted in the plane of the optical image of the relatively moving ground. The system includes means for producing relative oscillation between the optical image and the sensor with such relative oscillation occurring between two extreme angular positions symmetrically located about a medial position. Circuit means are connected to the sensor and are arranged to be sensitive to a difference in the frequency of the signals emitted by the sensor at said extreme angular positions, the circuit means being arranged to produce a control signal in accordance with such difference. Servo-motor means responsive to the control signal act to rotate the medial position of such relative oscillation to a location with respect to which the frequenecies of the output signals of the sensor at both the extreme angular positions are equal whereupon the control signal is nulled. A suitable transducer means for measuring the angle of rotation of the medial position gives an indication of the actual drift angle.

The present invention is illustrated by way of example with reference to the accompanying drawings wherein:

FIG. 1 illustrates schematically the simplest form of the invention including a pair of elongated sensors mounted on a manually adjustable turntable;

FIG. 9 is a diagrammatic view of one embodiment for producing relative oscillation between a sensor and the ground image speed;

Figure 2B:
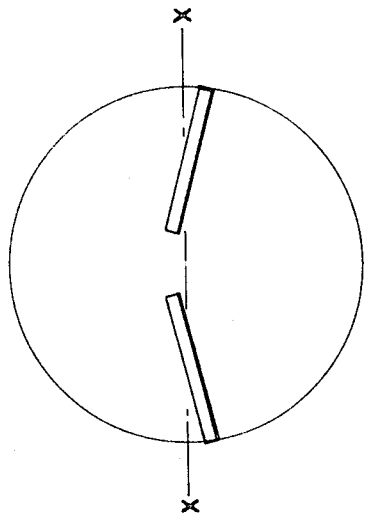
FIG. 2 illustrates various configurations which the elongated sensors may assume.

One embodiment of the present inventiion is shown in FIGURE 1. A lens system designated as L forms a moving image of the relatively moving ground. In the image plane of the lens L are positioned two photosensors 1 and 2 each of the latter including photosensitive surfaces of the photo-voltaic type arranged to have a high length to width ratio. Although the photosensors 1 and 2 shown in FIGURE 1 and in further embodiments to be illustrated hereinafter, are of oblong, rectangular configuration, it lies within the scope of the invention to employ photosensitive elements of other shapes as well so long as the photosensitive surface has a high length to width ratio. The photosensitive area must include one elongated side portion having a radius that is very large tending to infinity.

The photosensors 1 and 2 which lie in the image plane of the lens system L are made to lie at a slight angle with respect to each other as shown in FIGURE 1 and they are mounted on a common rotatable turntable designated as 2a. The axis of symmetry of the sensors 1 and 2 is shown as X—X and it will be seen that the photosensors 1 and 2 make relatively small, equal but opposite angles with respect thereto.

The rotatable turntable 2a permits the axis of symmetry X—X of the sensors 1 and 2 to be rotated and made to lie either parallel to the air vehicle's longitudinal or reference axis or alternatively at a slight angle thereto. Suitable mechanical transducer means 2b are connected to the turntable 2a. The transducer 2b is arranged to give an indication of the angle between the axis of symmetry X—X of the sensors 1 and 2 and the longitudinal axis of the aircraft.

The electrical outputs of the sensors 1 and 2 are separately connected to networks 6 and 3 (each including a series capacitor and a ground connected resistance), which in turn are connected to amplifiers 7 and 4. The outputs of the amplifiers are separately connected to rectifiers 8 and 5, with the latter in turn being connected to the inputs of a signal comparator 9. The output of comparator 9 is connected to an indicating meter 10.

In the operation of the system of FIGURE 1, the turntable 2a is rotated such that the symmetry axis X—X of the sensors 1 and 2 is initially positioned parallel to the longitudinal axis of the vehicle. If there is no cross wind or drift of the air vehicle, the longitudinal axis of the latter will be in the direction of the ground velocity vector. Under these circumstances, as the image of the ground moves across the sensors 1 and 2 during flight, each of the sensors 1 and 2 will receive the same number of crossovers of dark and light image spots during a given time interval. The sensors 1 and 2 will react by giving the same number of minus or plus electrical changes in the average electrical output, i.e., the random frequency spectrum of each sensor will be the same.

On the other hand if the axis of symmetry X—X of the sensors 1 and 2 is not parallel to the ground velocity vector due to a cross wind or other factors acting on the air vehicle, then one sensor will receive more cross-overs of dark and light spots than the other. The electrical output of said one sensor will then be "noisier," (i.e., contains higher frequencies) than the output of the other sensor, because there are more changes for such one sensor during any given time interval, such changes also having a more abrupt character in view of the fact that the light spots enter and leave the sensitive area of the photosensor at faster rate.

The varying voltage outputs from both sensors, as for example from sensor 1, is differentiated with respect to time by the effects of network 6 and the resulting voltages are amplified by amplifier 7. These amplified voltages are rectified by rectifier 8 and fed to the comparator 9. Simultaneously the signals from sensor 2 are similarly differentiated, amplified and rectified, by network 3, amplifier 4, rectifier 5 respectively, and then fed to the other input of comparator 9.

It will be realized here that the "noisier" of the signals received from sensors 1 and 2 will, after differentiating, for example, show a higher RMS value than the less noisy signal. These differentiated signals can, after rectification, be directly compared, with the sign of the algebraic difference between the two rectified signals determining which of the sensors 1 and 2 has the "noisiest" output. Accordingly, therefore, the comparator measures the algebraic difference between the signal outputs of sensor 1 and 2 and feeds the resultant to the indicating meter 10 which indicates the magnitude and algebraic signs of the resultant difference.

In the embodiment of FIGURE 1, the turntable 2a is arranged to be shifted manually. Therefore, the pilot or operator rotates turntable 2a until the voltmeter 10 indicates 0. When the volutmeter 10 reads 0, it follows from the above that the axis of symmetry X—X of the sensors 1 and 2 is parallel to the direction of the ground speed image produced by the lens L. Therefore, it follows that the angle which the axis of symmetry X—X makes with respect to the vehicle longitudinal axis is the occurring drift angle. This drift angle can be readily measured by the transducer means 2b.

Figure 2A:
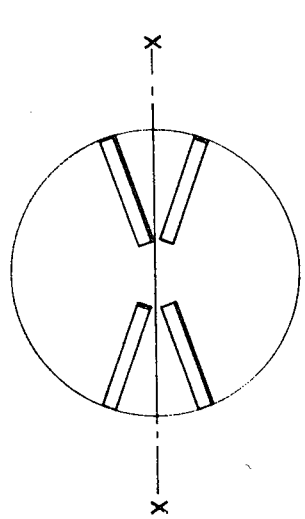
Figure 2C:
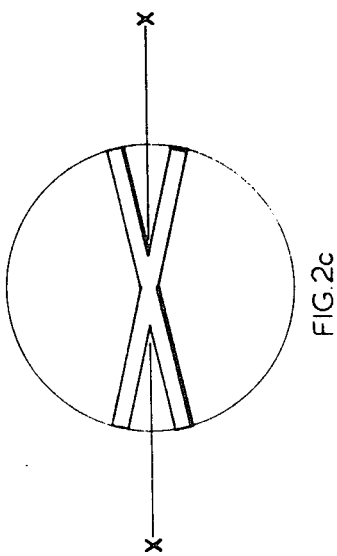

The photosensors 1 and 2 may be arranged in various configurations as depicted in FIGURE 2. In FIGURE 2a, two separate pairs of spaced photosensitive elements are arranged in an X fashion with the pairs of aligned elements making equal but opposite angles to the axis of symmetry X—X of the sensors. In FIGURE 2b a sensor arrangement identical to the sensor arrangement of FIGURE 1 is illustrated. In FIGURE 2c a further pair of photosensitive elements is shown arranged such that they cross each other in a "X" fashion with each sensing element making a shallow angle with respect to the symmetry axis X—X. The photosensors, also overlying each other closely, are suitably insulated from one another by means not shown.

As explained previously, as the ground speed image moves across the sensor, random frequencies are generated in the electrical output of the latter. These random frequencies vary as a function of the angular orientation of the sensors with respect to such image and it can be shown that as a result, the mathematical differential with respect to time of the sensor output varies in amplitude as a sine funtcion of the angle between the longitudinal axis of the sensor and the direction of image motion. When this angle is 0, the differential is 0 also.

Figure 4:
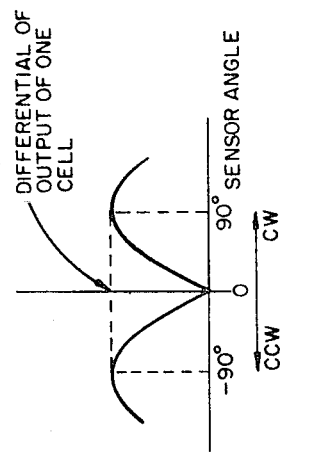
FIGS. 3–7 are graphs for the purposes of illustrating the sensitivity of the systems of the present invention.
Figure 6:
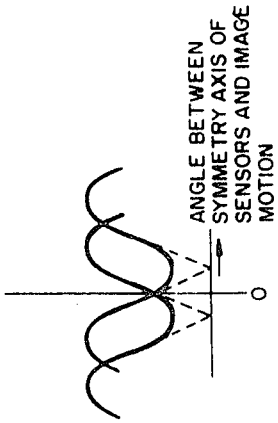
Figure 3:
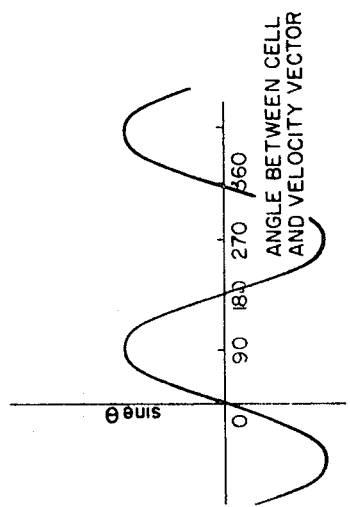
Figure 5:
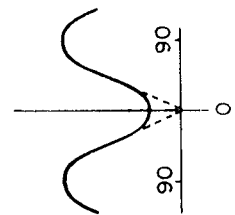

Looking at FIGURE 3 which shows the typical graph of a sine function, it is evident that at 90°, when the value of the function is a maximum, the slope of the curve is 0. Hence over a small range of angles near 90°, the change in sine function is very small. If we therefore attempt to use the differential of the sensor output to place the sensor at 90° to the direction of image motion, that is, at the maximum value, we will not be able to do so with great accuracy since the sine curve has a near-zero slope at all angles close to 90°. If, on the other hand, we seek the sensor position of zero differential, that is, the position wherein the longitudinal axis of the sensor is parallel to the direction of image motion, we find that this can be achieved with satisfactory accuracy since the slope of the since function is at a maximum at this point as readily seen from FIGURE 3. FIGURE 4, which represents the graph of differential versus sensor angle also clearly illustrates the point mentioned above. It will be seen that the differential changes most rapidly when the sensor angle is near zero, with the slope of the graph of differential with respect to sensor angle gradually decreasing as sensor angle increases. The graph of FIGURE 4 represents the theoretical or ideal condition but in practice a sensor having finite width compared to length does not follow this theoretical curve, but deviates as shown in FIGURE 5. The curve of FIGURE 5 does not have a sharp cusp adjacent the origin zero as does the theoretical curve of FIGURE 4. However, it is important to realize here that if two sensors are utilized and inclined at a small angle with respect to one another as shown, for example, in the embodiment of FIGURE 1 or the embodiments of FIGURE 2, with the direction of the image motion generally along or at a slight angle of the X—X axis of symmetry of such sensors, the effects of the deviation shown in FIGURE 5 can be effectively overcome. As an example of this, reference should be had to the arrangement of sensors 1 and 2 in FIGURE 1 and as further shown in FIGURE 2b with X—X being the axis of symmetry. FIGURE 6 shows the graph of the differential of each sensor output versus the angle between the X—X axis and the direction of image motion. Curve A represents the graph for the differential of the output of sensor 1 while Curve B represents the differential of the output of sensor 2.

Figure 7:
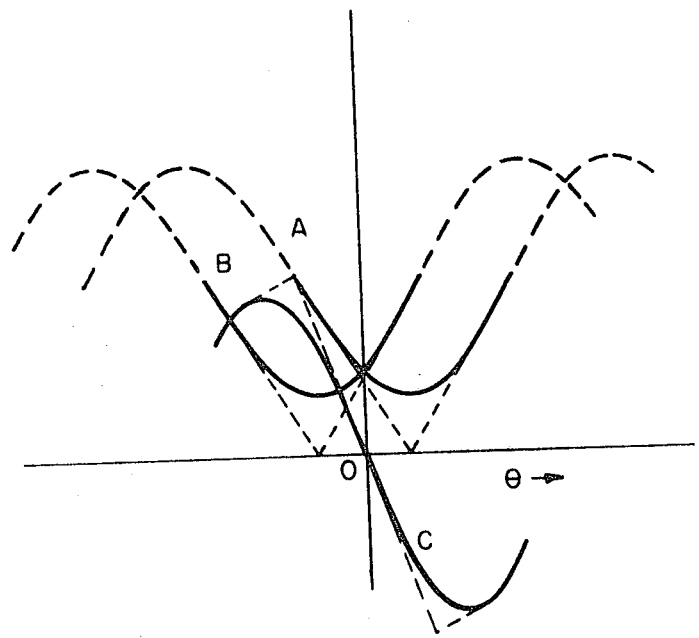

If the algebraic difference between curves A and B shown in FIGURE 6 is plotted for the same various angles, the graph of such algebraic difference will be as shown in FIGURE 7 curve C. It will be seen from this that curve C passes through the origin at maximum slope. From this it follows that we have regained the resolution and accuracy inherent in the system. The dotted curves represent the theoretical situation, while the solid lines are actual. FIGURE 7 also illustrates an additional feature of the systems of the present invention which can be put to advantage. This is the fact that the algebraic difference is positive or negative depending on the direction of angular displacement between the X—X axis of symmetry of the sensors and the direction of image motion. This immediately indicates in which direction the sensor pair should be turned to seek the position of zero signal output difference. This positive or negative difference can, as well shall see hereafter, be utilized by a servo-motor to shift the axis of symmetry of the photosensor in the correct direction to reduce the signal output difference between the sensors to a zero or null value.

Figure 8:
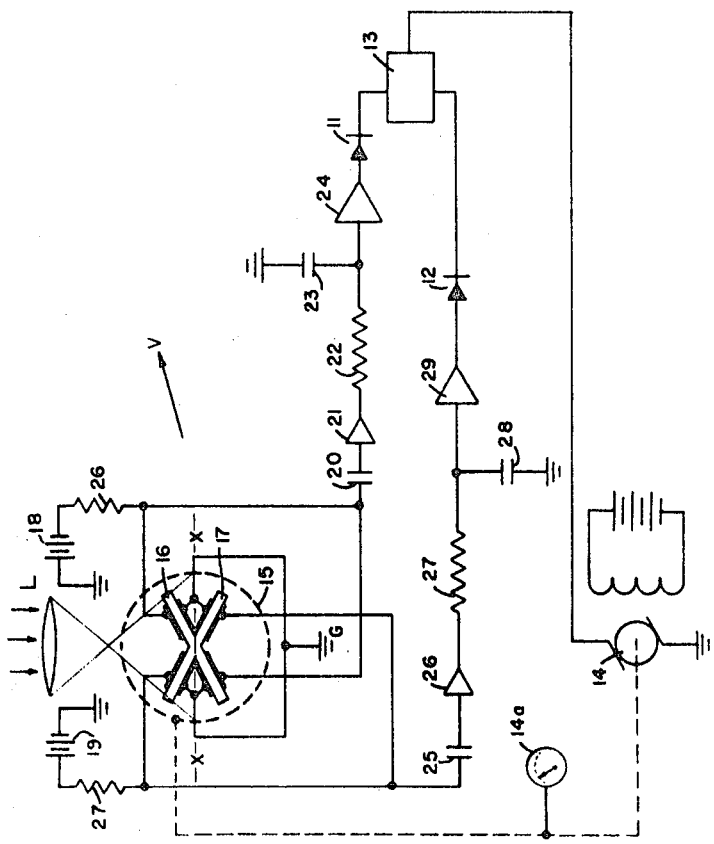
FIG. 8 is a further embodiment of the present invention employing a pair of crossed light sensitive members mounted on a turntable which is adjustable by means of a servo system.

An embodiment of the invention wherein the outputs of the photosensors are used to automatically steer the axis of symmetry of the sensors into alignment with the ground speed vector is shown in FIGURE 8. A rotatable turntable 15 has mounted thereon a photoconductive element in the form of crossed legs 16 and 17. Each leg of the crossed pair has a voltage impressed by means of voltage sources 18 and 19 in series with resistors 26 and 27, respectively. The details of the wiring which permits such voltage to be impressed across each of the legs 16 and 17 will readily be apparent to those skilled in the art from the drawings and further details thereof will not be recited here.

The turntable 15 and the photoconductive element mounted thereon lie in the ground image plane formed by the lens system L. The turntable 15 is driven in rotation in this plane by means of the servomotor 14.

As the ground speed image moves over and relative to the legs 16 and 17 of the photoconductive element, the conductivity (or alternatively resistance) thereof changes in response to the varying intensity of the light and dark spots of the image. This results in varying voltages being respectively impressed upon the capacitors 20 and 25. To remove the average D.C. level after amplification by amplifiers 21 and 26 the A.C. signal is impressed on resistors 22 and 27. These resistors in conjunction with the respective ground-connected capacitors 23 and 28 respectively have the effect of mathematically integrating the varying voltage outputs produced by legs 16 and 17. Amplifiers 24 and 29 then amplify the integrated output signals of legs 16 and 17 respectively, such integrated and amplified signals being thereafter rectified by rectifiers 11 and 12 with the resulting signals being fed to the comparator 13.

The comparator 13 derives the algebraic difference between the two signals fed thereto and this difference appears as an output which is fed to the servo-motor 14. Depending on the polarity (positive or negative) of the output of the comparator, the servo-motor 14 will rotate clockwise or counter-clockwise. The servo-motor 14 being geared to the turntable 15, will rotate the later such that the axis of symmetry X—X of the crossed legs 16 and 17 is rotated in a direction to reduce the algebraic difference of the signals fed to comparator 13 to zero. The angle between the axis of symmetry X—X and the reference axis of the air vehicle, after the servo-motor has driven the system to the null position, will be the prevailing drift angle. This drift angle may be readily measured by a drift angle meter arrangement 14a coupled to the output of the servo-motor 14.

The two preceding embodiments described in FIGURES 1 and 8 are but two of many envisaged as possible embodiments of the invention. For example, any of the sensitive element configurations depicted in FIGURE 2 can be used in place of those in FIGURES 1 and 8 and such photosensitive elements may be either of the photoconductive, photovoltaic or photomultiplier type. Alternatively, it is possible to separate the sensitive elements and place the same in separate images of the ground which is moving relative to the air vehicle.

It is also possible to use the circuitry as described in FIGURE 8, but have the gain of amplifiers 21 and 26 chosen so high, that nearly all practical A.C. input signals result in square wave output signals from the amplifiers due to the saturation level of the amplifiers used.

This feature would remove the sensitivity of the system for small differences of light sensitivity of the "cells" as function of temperature or light level.

In all of the embodiments described thus far a pair of elongated photosensitive elements were provided, such photosensitive elements being mounted for movement as a unit such that the axis of symmetry thereof could be shifted by suitable means into correspondence with the ground speed image vector thereby to equalize the electrical outputs of the sensors. In the embodiments to be described hereinafter, a single elongated sensor only is utilized, the latter being positioned in the plane of an optical image of the ground speed vector. These systems all include means for producing relative oscillatory motion between the optical image and the sensor with such oscillation occurring between two extreme angular positions symmetrically located with respect to a medial position. The manner in which such systems operate to provide an indication of drift angle will now be explained fully.

Referring now to FIGURE 9 there is schematically shown a lens system L which is mounted in or on an airborne vehicle, the longitudinal axis of which is indicated by the arrow P. Lens L receives light energy from the terrain over which the aircraft is passing and forms an optical image of the relatively moving terrain.

A photosensor S including a narrow oblong light sensitive cell A (the latter being preferably but not necessarily straight) is mounted in the image plane of the lens L on suitable support means (not shown) which permit the photosensor to be oscillated about an axis normal to the image plane.

Figure 10:
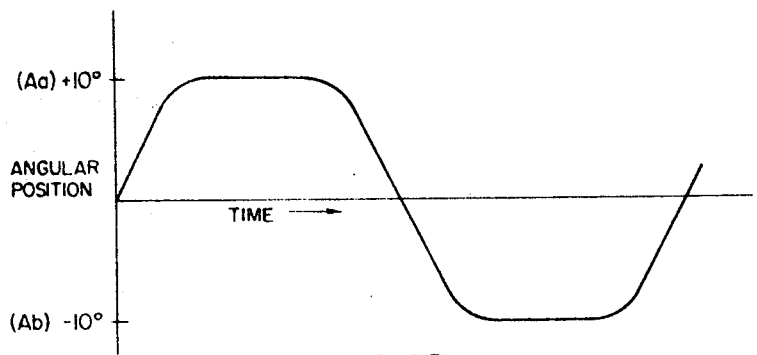
FIG. 10 is a graph of the time-angular position relation of the oscillating relative motion between the optical image of the terrain and the light responsive electric cell.

The photosensor receives its oscillating motion from the output of a differential mechanism M the latter having two motion inputs, the first from an oscillating drive D and the second from a servo-motor 121. The oscillating drive D may comprise an intermittently energized solenoid, or alternatively a motor driven cam and follower arrangement. In any event the oscillating drive D is arranged such that the sensitive cell A is oscillated between two extreme angular positions Aa and Ab which may be, for example, about 20° apart, with a dwell or rest period being provided at each of the extreme angular positions. A graph of the angular position of the cell A with respect to time is shown at FIGURE 10, the latter clearly showing the dwell periods at each of the extreme angular positions Aa and Ab.

Since the output of the differential mechanism M comprises the sum of the first and second inputs thereto, it is evident that the motion input from the servo-motor 121 effects angular rotation in the image plane of the medial position Am (i.e. that position about which the extreme angular positions Aa and Ab are symmetrically disposed) of the cell A.

The fluctuating output signal of the photosensor S is tapped off by suitable contacts means (not shown) and is thence fed via serially connected blocking capacitor 110, and amplifier 111 through an RC network comprising capacitor 112 and ground connected resistor 113. The signal is then fed through rectifier 114 to the switch 115.

The switch 115 is operatively connected to the output of the oscillating drive D such that the switch is driven in synchronism with the photosensor oscillation, hence closing contact 116a during the time when the sensitive area A dwells in angular position Aa, and closing contact 116b when sensitive area A is in angular position Ab.

Contact 116a is connected to a first RC network which comprises a discharging resistor 117a connected to ground a further resistor 118a series connected in the circuit, and a grounded capacitor 119a. The signals passing through the RC network are then fed into the differential amplifier 120. The second contact 116b is connected to a second RC network identical to the one described above and comprises ground connected resistor 117b, serially connected resistor 118b and ground connected capacitor 119b. Signals passing through the second RC network are fed into differential 120.

The signal output of amplifier 120 is fed into a servomotor 121 to control the direction of rotation of the latter as mentioned previously. The output of the servo-motor is connected to the differential mechanism M. The output of the servo-motor is also connected to a transducer T, for example a potentiometer, the latter serving to give an indication of the occurring drift angle.

The operation of the system of FIGURE 9 is as follows: in each extreme angular position of the sensitive cell A, dark and light ground features cross the photosensor and generate voltage or current noise. If the two angular extreme positions are symmetrical with respect to the image motion vector V, the average of the generated noise will be equal in both extreme positions. Suppose now that the two extreme angular positions Aa and Ab are symmetrical with respect to the longitudinal axis (in line with arrow P) of the flying vehicle. Suppose also that the ground speed vector V is inclined with respect to the vehicle axis P due to a cross wind. The cell A in one extreme angular position (Ab) will then be more inclined with respect to the ground speed or image motion vector V than in the other extreme angular position (Aa). In the most inclined position (Ab) the noise frequency will be higher because more light and dark spots will enter and leave the cell area at a higher speed.

The signal emitted by cell A with the D.C. level removed by means of the blocking capacitor 110, is amplified by the amplifier 111 and differentiated by the RC network 112 and 113 and then rectified by the rectifier 114. This rectified signal will show a higher amplitude during the most inclined angular position of the cell A. In position A$a$, cell A and hence contact position 116$a$ of switch 115, the rectified photosensor signal is fed to the first RC network which as described previously comprises the discharging resistor 117$a$, the resistor 118$a$ and the capacitor 119$a$, whereupon the capacitor 119$a$ will be partly charged by the rectified signal voltage. After the stay time of the cell A in the position A$a$ has elapsed, the contact 116$a$ is opened with the capacitor 119$a$ partly discharging to ground via the resistors 118$a$ and 117$a$.

When the cell A reaches the position A$b$, contact 116$b$ will be closed and the capacitor 119$b$ will be partly charged by the rectified signal voltage of the cell A in the position A$b$. Finally contact 116$b$ will be opened and the capacitor 119$b$ partly discharged to ground via resistors 118$b$ and 117$b$.

The circuit is designed such that the time constant of the RC network is two to ten times longer than the charging or discharging time; hence the capacitor voltage will fluctuate about an average level. If the signal of cell A in the position A$a$ is higher than in the position A$b$, the capacitor 119$a$ will have a higher average voltage level than the capacitor 119$b$. The difference voltage between the capacitors 119$a$ and 119$b$ is then amplified by the amplifier 120 and fed into the servo-motor 121 which, depending on the sign of the voltage difference, rotates the support (not shown) of the photosensor S and hence the medial cell position A$m$ clockwise or anticlockwise in such a way that the output of cell A in both extreme positions becomes equal again; the voltage difference will then be zero and the servo-motor 121 will stop.

The servo-motor 121 has then rotated the medial cell position through an angle equal to the occurring drift angle. This rotation is measured by the transducer T whose output is an electrical signal proportional to the actual drift angle.

Figure 11:
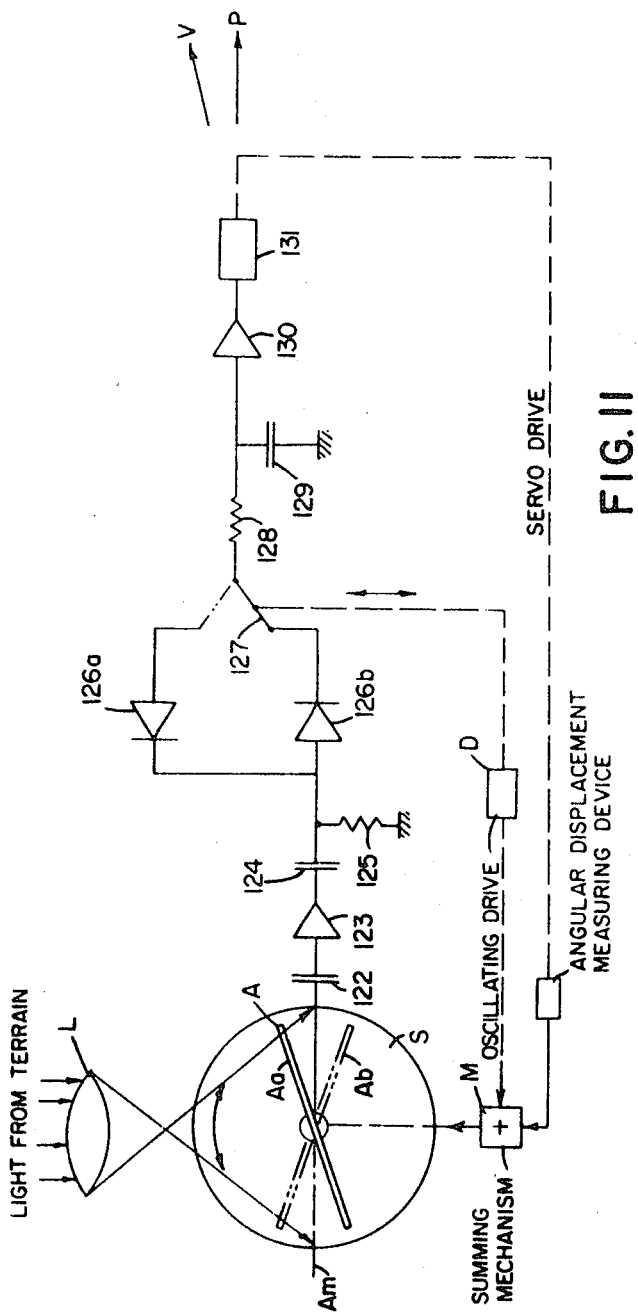
FIG. 11 is a diagrammatic view of another embodiment of the invention including a modified circuit layout.

The system shown in FIGURE 11 is in many respects similar to the system shown in FIGURE 9 and includes the photosensor S having an elongate light sensitive cell A the latter being oscillated between two extreme angular positions A$a$ and A$b$ symmetrically located with respect to medial cell position A$m$. As in the system of FIGURE 9, the cell A is driven from a differential mechanism M the later receiving one input from an oscillating drive D and a further input from a servo-motor 131.

The structure and function of the circuitry of the system shown in FIGURE 11 is as follows:

The cell output signal with the D.C. level removed by means of a blocking capacitor 122 is amplified by amplifier 123 and differentiated by an RC network comprising components 124 and 125. The signal is then rectified by one or other of the rectifiers 126$a$, 126$b$, the former being connected for positive rectification while the latter is connected for negative rectification. A switch or commutator 127 driven from the oscillating drive in synchronism with the cell oscillation connects an RC network comprising a condenser 129 and resistor 128 to the positive rectifier 126$a$ when the cell angular position is A$a$, and switches the network to the negative rectifier 126$b$ when the cell is in the positive A$b$. The average voltage of capacitor 129 will be positive if the cell output during the position A$a$ is higher than in the position A$b$ and vice versa.

The positive or negative voltage of the capacitor 129, after being amplified by the amplifier 130, is used to steer the servo-motor 131 to a position such that the cell output at the extreme angular positions becomes equal by rotating the medial cell angular position A$m$. As soon as the medial cell position A$m$ is in alignment with the ground speed vector the signals become equal and the signal to the servo-motor is nulled. The amount of rotation is measured by means of transducer T connected to the output of servo-motor 131 to give an indication of the occurring drift angle.

The systems illustrated in FIGURES 9 and 11 actually oscillate the elongated light sensitive cell A. It is also possible to mount the cell in a fixed position and to provide means for oscillating the ground speed image. A system of this nature is shown in FIGURE 12.

Figure 12:
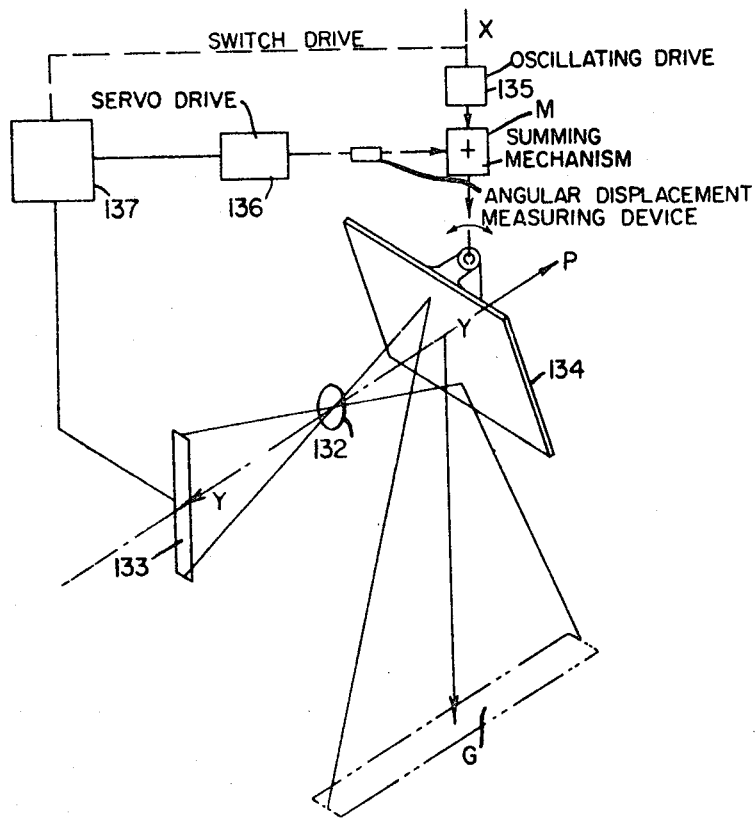
FIG. 12 is a diagrammatic view of a still further embodiment of the invention incorporating oscillating mirror means for oscillating the ground image relative to the photocell.

In the system of FIGURE 12 a lens 132 is positioned to define a horizontal optical axis Y—Y. An elongated photosensitive cell 133 is fixed with respect to the aircraft and positioned in the image plane of the lens 132 with its longitudinal axis in the vertical direction. A mirror 134 is mounted in front of lens 132 for oscillation about the vertical axis X, the later intersecting the optical axis Y—Y. The mirror is designed such that its reflecting face is inclined at 45° to the horizontal and it is readily seen that the cell 133 observes an oblong area G of terrain beneath the aircraft.

The remaining components of the system of FIGURE 12 are the same as shown in FIGURES 9 and 11. The oscillating drive 135 (having the same characteristics as the systems of FIGURES 9 and 10) acting through differential M oscillates mirror 134 about axis X between two extreme positions while the servo-motor 136, also acting through differential M serves to rotate the medial position of oscillation of the mirror 134 until the signal output of circuitry 137 has been nulled. The circuitry 137 is identical to the circuitry shown in FIGURES 9 or 11 and receives its input from cell 133, while the output signal of the circuitry is fed to the servo-motor 136. As with the systems of FIGURES 9 and 11, the switching means (not shown) of circuitry 137 is driven from the oscillating drive 135, while a suitable angular displacement measuring device driven from the servo-motor 136 gives an indication of the actual drift angle.

Figure 13:
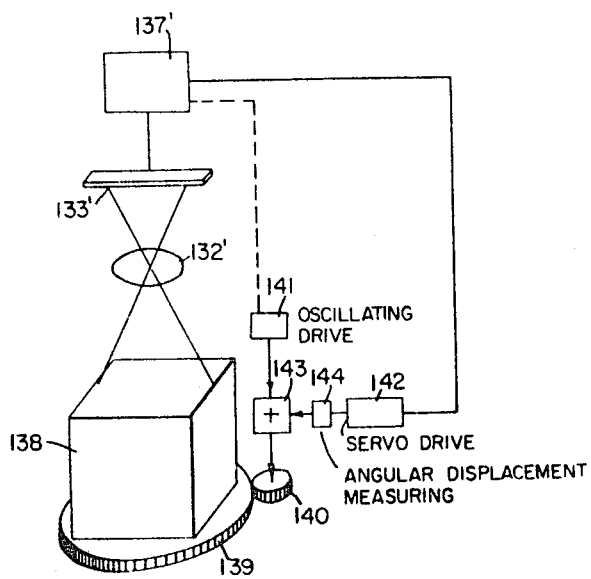
FIG. 13 is a diagrammatic view of a further alternative embodiment of the invention including oscillating prism means for oscillating the ground image relative to the photocell.

A further embodiment incorporating a light sensitive cell 133′ fixed with respect to the aircraft is shown in FIGURE 13. Below the lens 132 is a so-called Dove prism 138 mounted on a carrier 139 which is intermittently oscillated through a suitable angle, say ±5°, by means of a gear 140 operatively connected by differential gear 143 with an oscillating drive mechanism 141. The optical image in the plane of the cell 133 by virtue of the Dove prism will show the ground oscillating at twice the angle of oscillation of the prism, in this case ±10°. The circuitry 137′ will be the same as shown in FIGURE 9 or 10 so that the servo-motor 142 will rotate the medial position of oscillation of the prism 138 until equal signals are produced by cell 133 at each extreme angular position at which time the output signal of circuitry 137 is nulled and the servo-motor stops. As in the previously described systems an angular displacement measuring device 144 driven from servo-motor 142 gives an indication of the occurring drift angle.

I claim:
1. A drift angle meter for use in aircraft comprising:
 (a) means providing an optical image of the ground underlying the moving aircraft,
 (b) elongated light sensitive means arranged to receive said optical image,
 (c) means for positioning either the optical image of the ground or the light sensitive means such that one occupies, relative to the other, a pair of angular positions symmetrically located about an axis of symmetry whereby the light sensitive means produces fluctuating electrical outputs in response to the optical image,
 (d) circuit means associated with said light sensitive means and being adapted to produce an output signal indicative of a frequency difference between the outputs of the light sensitive means at said angular positions thereby giving an indication of an angular displacement between the axis of symmetry, and the direction of the ground speed vector of the moving aircraft, (e) said positioning means arranged to permit adjustment of said optical image and light sensitive means relative to one another such that said symmetry axis defined by one of the latter is brought into correspondence with the direction of the ground speed vector whereby any such frequency difference may be nullified, (f) and means responsive to the adjustment of the positioning means, and arranged to relate such adjustment to the longitudinal axis of the aircraft to give an indication of drift angle.

2. A drift angle meter according to claim 1 wherein said light sensitive means comprises a pair of elongated light sensitive surfaces fixed relative to one another on said positioning means and arranged at said pair of angular positions.

3. A drift angle meter according to claim 2 wherein the positioning means comprises a support which is rotatable to permit adjustment of the axis of symmetry into correspondence with the ground speed vector.

4. A drift angle meter according to claim 3 further comprising a servo-motor having an input connected to receive said output signal of the circuit means, and an output operatively connected to the rotatable support, said servo-motor being arranged to respond to the control signal by rotating said support to a position whereat the outputs of the pair of light sensitive means are substantially equalized.

5. A drift angle meter according to claim 4 wherein said circuit means includes for separately amplifying, differentiating and rectifying the signal outputs of each light sensitive means, and means for thereafter comparing the signals to produce an output signal of algebraic sign determined by which one of the pair of light sensitive surfaces produces the higher frequency signal.

6. A drift angle meter according to claim 1 wherein said light sensitive means comprises a single elongated sensor, said positioning means including intermittent motion means for alternately positioning said sensor at said pair of angular positions.

7. A drift angle meter according to claim 6 further comprising a servo-motor having an input connected to receive said output signal of the circuit means and an output operatively connected through connection means to said positioning means, said connection means comprising a summing mechanism having a pair of inputs and means to sum said inputs to produce an output, said summing mechanism being connected at one of its inputs to the intermittent motion means and at its other input to th output of the servo-motor, the output of the summing mechanism being connected to said positioning means, said servo-motor being arranged to respond to the control signal by rotating the positioning means to a position whereat the outputs of the sensor at each of the angular positions are substantially equalized.

8. The drift angle meter according to claim 7 wherein said circuit means comprises; means for amplifying, differentiating and rectifying the signals emitted by the sensor means, first and second circuit portions each constructed to produce a voltage of average magnitude proportional to the frequency of the amplified, differentiated and rectified signals, switch means operatively coupled with the intermittent motion means and driven in synchronism therewith for alternatively connecting said first and second circuit portions at said pair of angular positions to the means for amplifying, differentiating and rectifying said signals, and means connected to the first and second circuit portions for comparing a difference in the voltage outputs of said first and second circuit portions and amplifying same to thereby produce said circuit output signal.

9. The automatic drift angle meter according to claim 8 wherein the intermittent motion means is constructed and arranged to provide a dwell period in said oscillation at each of said angular positions.

10. A drift angle meter according to claim 1 wherein said light sensitive means comprises a single elongated cell, and wherein the means providing said optical image is associated with said positioning means with the latter being arranged for oscillation to shift the optical image between said pair of angular positions.

11. A drift angle meter according to claim 10 wherein the positioning means further comprises intermittent motion producing means to produce said shifting of the optical image between said pair of angular positions.

12. The automatic drift angle meter according to claim 11 wherein the intermittent motion means is constructed and arranged to provide a dwell period in said oscillation at each of said angular positions.

13. The drift angle meter according to claim 12 wherein said circuit means comprises; means for amplifying, differentiating and rectifying the signals emitted by the sensor means, first and second circuit portions each constructed to produce a voltage of average magnitude proportional to the frequency of the amplified, differentiated and rectified signals, switch means operatively coupled with the intermittent motion means and driven in synchronism therewith for alternatively connecting said first and second circuit portions at said pair of angular positions to the means for amplifying, differentiating and rectifiying said signals, and means connected to the first and second circuit portions for comparing a difference in the voltage outputs of said first and second circuit portions and amplifying same to thereby produce said circuit output signal.

14. A drift angle meter for use in aircraft comprising;
(a) means providing an optical image of the ground speed vector of the moving aircraft,
(b) elongated light sensitive means arranged to receive said optical image,
(c) means positioning the light sensitive means at a pair of angular positions symmetrically located with respect to a symmetry axis whereby the light sensitive means produce fluctuating electrical outputs in response to the optical image,
(d) circuit means associated with said light sensitive means and being adapted to produce an output signal indicative of a frequency difference between the outputs of the light sensitive means thereby giving an indication of an angular displacement between said symmetry axis and the ground speed vector,
(e) means arranged to permit adjustment of said symmetry axis with respect to the aircraft longitudinal axis whereby any such frequency difference may be nullified,
(f) and means for measuring the angle of displacement between such adjusted symmetry axis and the longitudinal axis of the aircraft to give an indication of the occurring drift angle.

15. A drift angle meter according to claim 14 further comprising a servo-motor connected to receive said output signal and operatively associated with said positioning means, said servo-motor arranged to respond to the output signal of the circuit means to adjust the symmetry axis of the light sensitive means to a position whereat the circuit means output signal is nulled.

16. A drift angle meter according to claim 14 wherein said light sensitive means comprises a pair of photosensors associated with said positioning means and located at said pair of angular positions.

17. A drift angle meter according to claim 15 wherein said light sensitive means comprises a pair of photosensors associated with said positioning means and located at said pair of angular positions.

18. A drift angle meter according to claim 14 wherein the light sensitive means comprises one elongated sensor, said positioning means including means for oscillating said one sensor between said pair of angular positions.

19. A drift angle meter according to claim 15 wherein the light sensitive means comprises one elongated sensor, said positioning means including means for oscillating said one sensor between said pair of angular positions.

References Cited

UNITED STATES PATENTS

| | | | |
|---|---|---|---|
| 2,918,581 | 12/1959 | Willey et al. | 250—83.3 |
| 2,942,119 | 6/1960 | King et al. | 250—204 X |
| 2,998,746 | 9/1961 | Gievers | 356—152 |
| 3,144,497 | 8/1964 | Hamilton | 250—299 X |

JAMES W. LAWRENCE, Primary Examiner

C. R. CAMPBELL, Assistant Examiner

U.S. Cl. X.R.

356—152; 250—204, 234, 235